United States Patent
Li et al.

(10) Patent No.: US 12,229,452 B2
(45) Date of Patent: Feb. 18, 2025

(54) READ COUNTER FOR QUALITY OF SERVICE DESIGN

(71) Applicant: Micron Technology, Inc., Boise, ID (US)

(72) Inventors: Yun Li, Fremont, CA (US); Jiangang Wu, Milpitas, CA (US); James P. Crowley, Longmont, CO (US)

(73) Assignee: Micron Technology, Inc., Boise, ID (US)

( * ) Notice: Subject to any disclaimer, the term of this patent is extended or adjusted under 35 U.S.C. 154(b) by 342 days.

(21) Appl. No.: 16/828,738

(22) Filed: Mar. 24, 2020

(65) Prior Publication Data

US 2021/0303340 A1 Sep. 30, 2021

(51) Int. Cl.
*G06F 3/06* (2006.01)

(52) U.S. Cl.
CPC ............ *G06F 3/0671* (2013.01); *G06F 3/061* (2013.01); *G06F 3/0653* (2013.01); *G06F 3/0659* (2013.01); *G06F 3/0679* (2013.01)

(58) Field of Classification Search
CPC ...... G06F 3/0659; G06F 3/061; G06F 3/0611; G06F 3/0679; G06F 3/0673; G06F 3/0656; G06F 3/0671; G06F 3/0653; G06F 13/1642; G06F 13/26; G06F 13/18; G06F 13/1626; G06F 13/1668; G06F 9/4881; G06F 9/4843; G06F 9/5038; G06F 9/3851; G06F 9/3836; G06F 2003/0697

See application file for complete search history.

(56) References Cited

U.S. PATENT DOCUMENTS

| 2004/0177184 A1* | 9/2004 | Steinman ............ G06F 13/4059 710/100 |
| 2013/0219088 A1* | 8/2013 | Rawe .................... G06F 3/0659 710/39 |

(Continued)

FOREIGN PATENT DOCUMENTS

| CN | 109564556 A | 4/2019 |
| CN | 110088725 A | 8/2019 |

OTHER PUBLICATIONS

Chinese patent office, "China Office Action," issued in connection with China Patent Application No. 202110303438.7 dated Mar. 6, 2024 (20 pages) (9 pages of English Translation and 11 pages of Original Document).

*Primary Examiner* — Curtis James Kortman
(74) *Attorney, Agent, or Firm* — Holland & Hart LLP

(57) ABSTRACT

Methods, systems, and devices for a read counter for quality of service design are described. First commands may be assigned to a first queue of a memory die of a memory sub-system, wherein the first queue is associated with a first priority level. The memory die may include a second queue associated with a second priority level different from the first priority level, the second queue comprising one or more second commands assigned. Based at least in part on a counter associated with the first queue and the first and second priority levels, it may be determined that a threshold number of the first commands of the first queue have issued without a command from the one or more second commands having issued. A command from the second commands may issue before issuing a next command of the first commands based at least in part on the counter.

17 Claims, 5 Drawing Sheets

(56) References Cited

U.S. PATENT DOCUMENTS

| | | | |
|---|---|---|---|
| 2014/0372696 A1* | 12/2014 | Tune | G06F 12/0846 |
| | | | 711/114 |
| 2018/0018133 A1 | 1/2018 | Balakrishnan | |
| 2018/0136851 A1* | 5/2018 | Batra | G06F 3/0685 |
| 2018/0165229 A1 | 6/2018 | Chhabra et al. | |
| 2018/0232178 A1* | 8/2018 | Iwaki | G06F 3/0659 |
| 2018/0321844 A1 | 11/2018 | Benisty | |
| 2019/0073295 A1* | 3/2019 | Lee | G06F 12/0253 |
| 2019/0303039 A1* | 10/2019 | Teh | G06F 3/0604 |
| 2021/0279001 A1* | 9/2021 | Kanno | G06F 3/0604 |

\* cited by examiner

READ COUNTER FOR QUALITY OF SERVICE DESIGN

TECHNICAL FIELD

The following relates generally to a memory sub-system and more specifically to a read counter for quality of service design.

BACKGROUND

A memory device or a memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various examples of the disclosure. The drawings, however, should not be taken to limit the disclosure to the specific examples, but are for explanation and understanding only.

DETAILED DESCRIPTION

Figure 1:
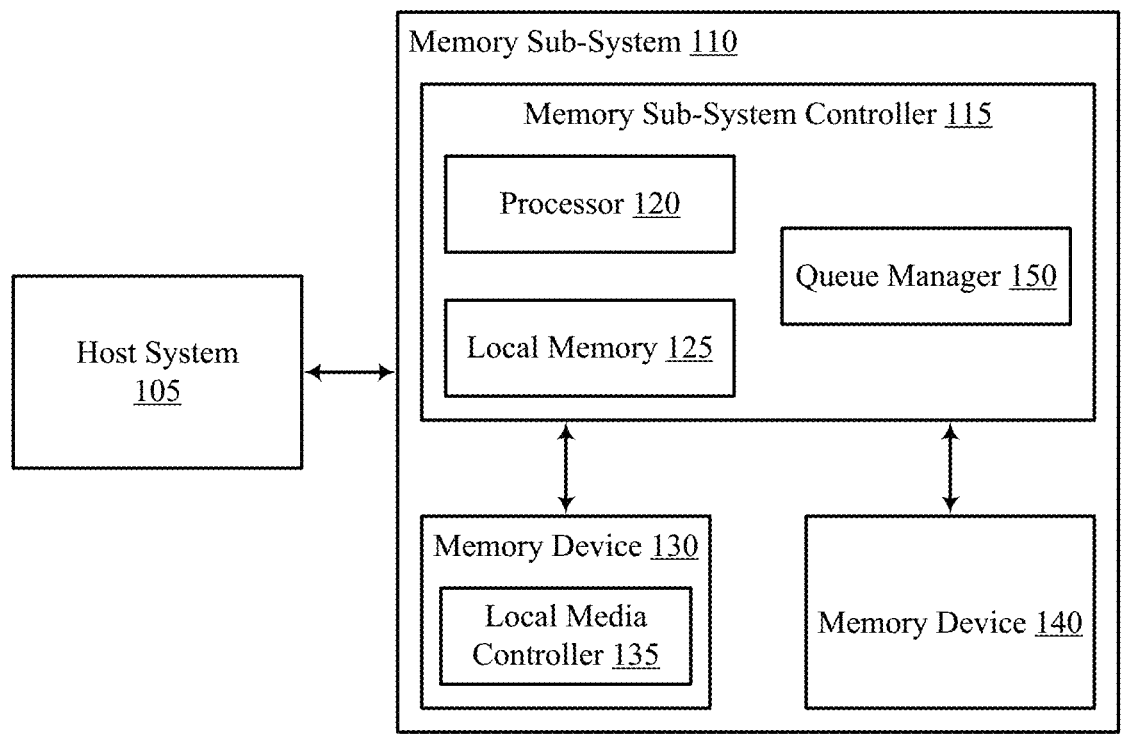
FIG. 1 illustrates an example computing environment that includes a memory sub-system in accordance with some embodiments of the present disclosure.

Aspects of the present disclosure are directed to managing queues in a memory sub-system using a read counter for quality of service (QOS) design. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components (also hereinafter referred to as "memory devices"). The host system can provide data to be stored at the memory sub-system and can request data to be retrieved from the memory sub-system.

A memory sub-system can include one or more memory cells, such as negative-and (NAND) memory cells (e.g., NAND flash memory cells). Such memory cells are capable of remaining in a charged or uncharged state for prolonged periods of time. Whether the memory cells resides in a charged state or an uncharged state is representative of a logic value stored to the cell (e.g., a logic "0" or a logic "1"). Multiple NAND cells can be strung together, and strings can be replicated multiple times within a single block. Each column of cells can be referred to as a "string" and each row can be referred to as a "page." Multiple strings and pages of NAND cells can collectively be referred to as a "block," multiple blocks can be included in a single plane, and multiple planes can be included in a memory die (e.g., a logical unit number (LUN)).

In traditional access operations of NAND cells, commands can be constantly transmitted to various memory dies. The commands can be associated with different access operations (e.g., read operations, write operations, etc.) having varying levels of priority. That is, it can be desirable for a host read command to be transmitted to a particular memory die before a read command or write command is transmitted to the same die. However, because memory sub-systems include many dies, and each die can be associated with a multitude commands and command types, traditional access operations can be unable to effectively prioritize transmitting commands. Accordingly, traditional access operations can result in backpressure on a local memory controller (e.g., due to a backlog of commands to be issued), which can tie up resources needed by the memory sub-system to issue commands. Thus a system to effectively manage commands, and command queues, at a die level may be beneficial.

Aspects of the present disclosure address the above and other deficiencies by managing queues of a memory sub-system at a die level. For example, each memory die of a memory sub-system can be associated with a queue (e.g., a memory die queue) for managing commands associated with the respective die. Further, each memory die queue can include multiple sub-queues (e.g., priority queues) for managing commands associated with particular priority levels. Thus when a command associated with a memory die is received, an associated request (e.g., a request for the command) can be assigned to the associated memory die queue (and to the relevant priority queue) for issuance. Based on the priority level associated with the command, it can be issued by a local memory controller.

For example, a memory die queue associated with a particular memory die of a memory sub-system can include one or more (e.g., three) priority queues. Each priority queue can be associated with (e.g., reserved for) commands associated with a particular priority level. One priority queue can be associated with commands having a priority level (e.g., a highest: a most-urgent), another priority queue can be associated with commands having a different priority level (e.g., an intermediate: a middle priority level), and an additional priority queue can be associated with commands having yet another (e.g., a lowest: a least-urgent) priority level. When a command for the memory die is received, it can be assigned to a priority queue based on its associated priority level, which can be predefined. Accordingly, commands in a higher priority queue can be issued before commands in a lower priority queue—i.e., a command in the highest priority queue can be issued before a command in the low priority queue. Further, when a command is assigned to a higher-priority queue when commands from a lower-priority queue are being issued, the issuance of the commands in the lower-priority queue can be temporarily paused in order for the higher-priority command to be issued. Once the higher-priority command is issued, the issuance of the commands in the lower-priority queue can resume. Such techniques can be performed die-by-die (e.g., each memory die can include respective queues), which can reduce backpressure that a local memory controller may otherwise incur, and may allow for the sub-system to issue commands based on available resources.

However, the commands having different priority levels in respective priority queues may, in some examples, result in a backlog of commands in the lower priority queues. For example, in the situation where commands having a highest priority level are assigned to a one queue and commands having a lower priority level are assigned to a different queue, the commands in the different queue may be unable to be issued when there is a constant or steady stream of commands arriving at the high priority queue. For instance, the commands in the other queue (e.g., the lower priority queue) must wait until the high priority queue have issued. Accordingly, aspects of the described techniques may associate a counter (or timer) with each queue (e.g., or with each priority queue) which can be leveraged to resolve this issue. For example, the counter (or timer) may be associated with the high priority queue (e.g., the higher priority queue) that tracks or otherwise monitors the number of commands (e.g., high priority commands in the high priority queue) have issued. The memory sub-system (or die) may determine that a threshold number of the high priority commands of the high priority queue have issued without a command from the low priority commands (e.g., the commands in the low priority or lower priority queue) having issued. When the counter reaches the threshold number of issued high priority commands from the high priority queue, command(s) from the low priority queue will be issued. For example, one, two, three, or some other number of commands from the low priority queue may issue once the counter reaches the threshold number for the number of issued high priority commands. The counter may then be reset or otherwise re-instantiated to once again monitor the number of commands issuing from the high priority queue without commands from the low priority queue having issued.

Features of the disclosure are initially described in the context of a computing environment as described with reference to FIG. 1. Features of the disclosure are described on the context of methods, firmware queue, command pool, etc., as described with reference to FIGS. 2-4. These and other features of the disclosure are further illustrated by and described with reference to a computer system that relates to a read counter for a quality of service design as described with reference to FIG. 5.

FIG. 1 is an example of a computing environment 100 that includes memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile DIMM (NVDIMM).

The computing environment 100 can include a host system 105 that is coupled with one or more memory sub-systems 110. In some examples, the host system 105 is coupled with different types of memory sub-systems 110. FIG. 1 illustrates one example of a host system 105 coupled with one memory sub-system 110. The host system 105 uses the memory sub-system 110, for example, to write data to the memory sub-system 110 and read data from the memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 105 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes a memory and a processing device. Examples of a physical host interface include, but are not limited to, a serial advanced technology attachment (SATA) interface, a peripheral component interconnect express (PCIe) interface, USB interface, a Fiber Channel, a Small Computer System Interface (SCSI), Serial Attached SCSI (SAS), etc. The physical host interface can be used to transmit data between the host system 105 and the memory sub-system 110. The host system 105 can further utilize an non-volatile memory Express (NVMe) interface to access the memory components (e.g., memory devices 130) when the memory sub-system 110 is coupled with the host system 105 by the PCIe interface. The physical host interface can provide an interface for passing control, address, data, and other signals between the memory sub-system 110 and the host system 105.

The memory devices can include any combination of the different types of non-volatile memory devices and/or volatile memory devices. The volatile memory devices (e.g., memory device 140) can be, but are not limited to, random access memory (RAM), such as dynamic RAM (DRAM) and synchronous DRAM (SDRAM).

Some examples of non-volatile memory devices (e.g., memory device 130) include negative-and (NAND) type flash memory and write-in-place memory, such as three-dimensional cross-point ("3D cross-point") memory. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more array's of memory cells such as SLCs, MLCs, TLCs, QLCs, or any combination of such. In some examples, a particular memory component can include an SLC portion, and an MLC portion, a TLC portion, or a QLC portion of memory cells. The memory cells of the memory devices 130 can be grouped as memory pages or memory blocks that can refer to a unit of the memory component used to store data.

Although non-volatile memory components such as NAND type flash memory are described, the memory device 130 can be based on any other type of non-volatile memory, such as ROM, phase change memory (PCM), self-selecting memory, other chalcogenide based memories, ferroelectric RAM (FeRAM), magneto RAM (MRAM), negative-or (NOR) flash memory, electrically erasable programmable ROM (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

In some examples, a material of a storage element of a memory cell can include a chalcogenide material or other alloy including selenium (Se), tellurium (Te), arsenic (As), antimony (Sb), carbon (C), germanium (Ge), silicon (Si), or indium (In), or various combinations thereof. In some examples, a chalcogenide material having primarily selenium (Se), arsenic (As), and germanium (Ge) can be referred to as a SAG-alloy. In some examples, a SAG-alloy can also include silicon (Si) and such chalcogenide material can be referred to as SiSAG-alloy. In some examples, SAG-alloy can include silicon (Si) or indium (In) or a combination thereof and such chalcogenide materials can be referred to as SiSAG-alloy or InSAG-alloy, respectively, or a combination thereof. In some examples, the chalcogenide glass can include additional elements such as hydrogen (H), oxygen (O), nitrogen (N), chlorine (Cl), or fluorine (F), each in atomic or molecular forms.

The memory sub-system controller 115 (or controller 115 for simplicity) can communicate with the memory devices 130 to perform operations such as reading data, writing data, moving data, or erasing data at the memory devices 130 and other such operations. The memory sub-system controller 115 can include hardware such as one or more integrated circuits and/or discrete components, a buffer memory, or a combination of such. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), digital signal processor (DSP)), or another suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include ROM for storing micro-code. While the example memory sub-system 110 in FIG. 1 has been illustrated as including the memory sub-system controller 115, in another example of the present disclosure, a memory sub-system 110 cannot include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130. The memory sub-system controller 115 can be responsible for other operations such as wear leveling operations, garbage collection procedures, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 105 via the physical host interface. The host interface circuitry can convert the commands received from the host system into command instructions to access the memory devices 130 as well as convert responses associated with the memory devices 130 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in conjunction with memory sub-system controller 115 to execute operations on one or more memory cells of the memory devices 130. In some examples, the memory devices 140 include local media controllers 145 that operate in conjunction with the memory sub-system controller 115 to execute operations on one or more memory cells of the memory devices 140.

The memory sub-system 110 includes a queue manager 150 that manages commands according to an associated priority level. For example, each memory die of a memory sub-system can be associated with a memory die queue. The memory die queues can each include one or more priority queues where commands (e.g., read commands, write commands, host read commands, etc.) are allocated for issuance. When a command associated with a particular die is received, the queue manager 150 can determine a priority level associated with the command (i.e., the queue manager 150 can determine a type of the command) and allocate the command to a respective priority queue associated with the die. Commands may be issued from respective priority queues based on the associated priority levels. Thus commands associated with queues having a higher priority level can be issued before commands associated with queues having relatively lower priority levels. The commands can be issued on a die-by-die level (e.g., higher priority commands of a die are issued before lower priority commands of the same die) or globally (e.g., higher priority commands are issued before lower priority commands regardless of the die). In either example, issuing commands according to a priority level of the respective command can reduce backpressure that a local memory controller may otherwise incur, and may allow for the memory sub-system to issue commands based on available resources.

Accordingly, the queue manager 150 may assign high priority commands to a high priority queue of a memory die of the memory sub-system 110, the high priority queue being associated with a high priority level. The memory die may also include a low priority queue associated with a low priority level that is different from (e.g., lower than) the high priority level. As discussed above, in some examples the queue manager 150 may issue commands from the high priority queue (e.g., the priority queue associated with the highest priority level) before issuing commands from the low priority queue (e.g., the priority queue associated with a lower priority level with respect to the high priority level). In some cases, this may create the situation where commands in the low priority queue (and a third queue, a fourth queue, etc., having lower respective priority level(s)) must wait an extended amount of time before being processed. Accordingly, aspects of the described techniques may associate a counter (or timer) with at least the high priority queue that tracks or otherwise monitors the number of commands being issued from the high priority queue. The commands in the low priority queue may also be tracked or otherwise monitored by the counter associated with the high priority queue and/or by a low priority counter associated with the low priority queue. Based on the counter(s), it may be determined that the number of commands issuing from the high priority queue without commands from the low priority queue having issued has reached a threshold number, e.g., the number of commands from the high priority queue and/or for a threshold amount of time. Accordingly, command(s) from the low priority queue may issue in response to the threshold number of commands from the high priority queue having issued. This may serve as a pressure relief valve preventing/mitigating backpressure on the memory sub-system 110 with respect to the low priority queue (and any other queues having a lower priority level than the high priority queue).

In some examples, the memory sub-system controller 115 includes at least a portion of the queue manager 150. For example, the memory sub-system controller 115 can include a processor 120 (e.g., a processing device) configured to execute instructions stored in local memory 125 for performing the operations described herein. In some examples, the queue manager 150 is part of the host system 105, an application, or an operating system.

Figure 2:
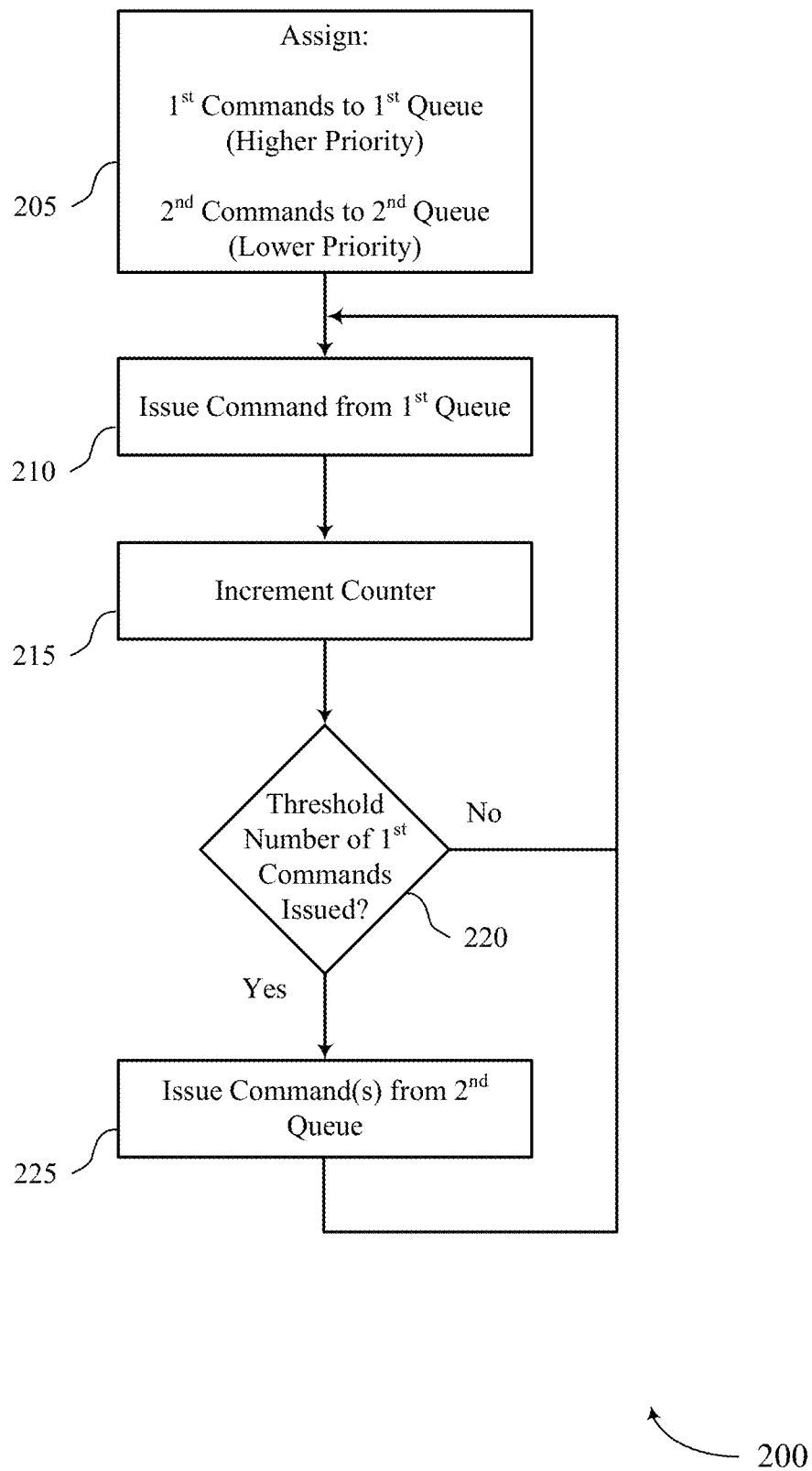
FIG. 2 is a flow diagram of an example method to manage queues of a memory sub-system using a read counter for quality of service design in accordance with some embodiments of the present disclosure.

FIG. 2 is a flow diagram of an example method 200 for managing queues using a read counter for quality of service design in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some examples, the method 200 is performed by the queue manager 150 of FIG. 1. Although shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other method flows are possible.

The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the queue manager 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the processing device can assign high priority commands to a high priority queue and low priority commands to a low priority queue of a memory die of a memory sub-system. The high priority queue can be associated with a high priority level and the memory die can include a low priority queue associated with a low priority level different from the high priority level. The low priority queue can include a low priority command and the high priority command and the low priority command can each be associated with a respective operation to be performed on the memory sub-system.

In some examples, the high priority level is a higher priority level than the low priority level. In some example, the high priority commands may be examples of host read commands. In some examples, the low priority commands may be examples of other commands, e.g., host write command(s), read command(s), write command(s), erase command(s), and the like. Accordingly, host read commands may be assigned or otherwise associated with a higher priority level than other command types.

At operation 210, the processing device can issue the high priority command from the high priority queue. The high priority command from the high priority queue may be issued without issuing a low priority command from the low priority queue based at least in part on the high priority and low priority levels.

In some examples, the method 200 can include assigning or otherwise associating a counter (or timer) with the high priority queue. In some examples, the method 200 may include assigning or otherwise associating a counter (or timer) with each queue of the memory sub-system. In some example, each counter may monitor or otherwise manage counting the number of commands issuing from the respective queue. For example, each counter associated with the respective queue may count each time a command issues from the queue. In another example, a single counter (or subset of counters) may be used to monitor or otherwise manage counting the number of commands issuing from each queue.

At operation 215, the processing device can increment the counter associated with the high priority queue. For example, the counter (or timer) may be incremented each time a command from the high priority queue issues. In some examples, the counter may increment each time a command from the high priority queue issues, each time a command from the high priority queue issues without a corresponding command from the low priority queue issuing, and the like. In some examples, the counter may track the number of commands issuing from the high priority counter and/or the number of commands assigned to the low priority queue.

In some examples, the method 200 can include incrementing a low priority counter associated with the low priority queue each instance that a command from the high priority queue issues without a command from the low priority queue has issued. In some examples, the method 200 can include the processing device determining that a command from the low priority queue has not issued for a threshold amount of time (e.g., the counter is based on a timer and/or there is a separate timer instantiated). In this example, the threshold number of commands issuing from the high priority queue without a command issuing from the low priority queue may be based on the threshold amount of time.

At operation 220, the processing device can determine whether a threshold number of commands from the high priority queue have issued without a command from the low priority queue having issued. In some examples, the threshold number for the counter (or timer) may be selected or otherwise set to a value that prevents backpressure from building on the processing device due to an excessive number of commands in the low priority queue backing up. For example, the threshold number may be set to a number (or time period) selected based on system throttling, load balancing, fairness, and the like.

If, at operation 220, the processing device determines that the counter has not reached the threshold number, the method 200 may return to the operation 210 and continue issuing command(s) from the high priority queue.

If, at operation 220, the processing device determines that the counter has reached the threshold number, the method 200 may continue to operation 225 where the processing device issues a command (or commands) from the low priority queue. In some examples, the command from the low priority queue may issue before issuing another command from the high priority queue.

In some examples, the method 200 can include issuing a plurality of commands from the low priority queue before issuing the next command from the high priority queue. In some examples, the method 200 can include resetting the counter after issuing the command(s) from the low priority queue. In some examples, the processing device may resume issuing commands from the high priority queue after issuing the command(s) from the low priority queue (e.g., return to operation 210).

Although the method 200 is generally described with reference to a processing device managing the high priority and low priority queues, it is to be understood that these techniques may be implemented across the processing device and in any number of queues of memory dies in the memory sub-system. For example, the processing device may assign commands to a plurality of high priority queues (e.g., on one or more dies), with each of the high priority queues being associated with a higher priority level and having an associated counter (or timer). The processing device may also assign commands to a plurality of low priority queues, with each of the low priority queues being associated with a lower priority level than the commands in the high priority queue. The processing device may determine, for each high priority queue and low priority queue, that the threshold number of commands from the high priority queue has issued without a command from the low priority queue having issued. The processing device may then issue command(s) from the low priority queue(s) based on the counter reaching the threshold number.

Figure 3A:
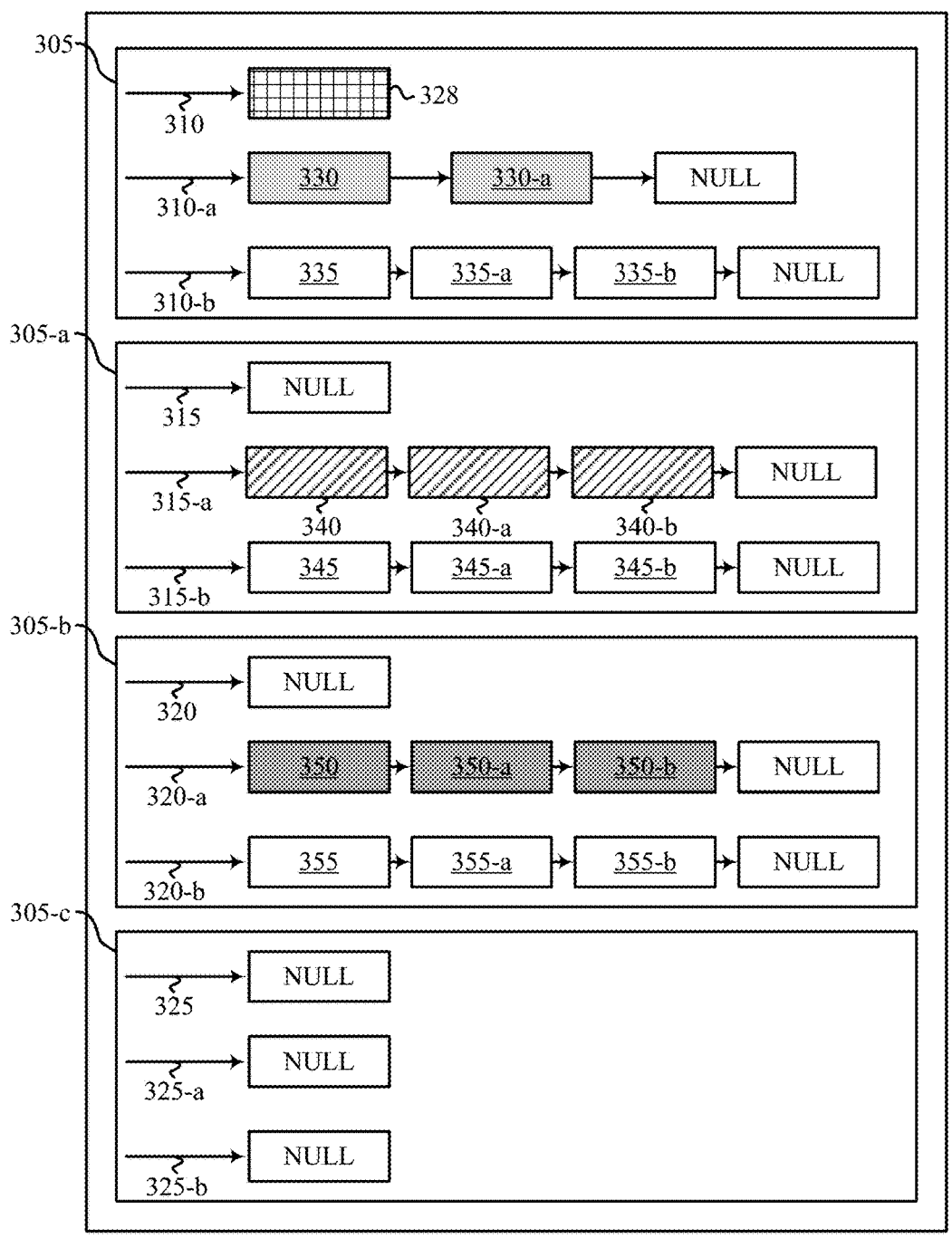
FIG. 3A is an example of a firmware queue of a memory sub-system in accordance with some embodiments of the present disclosure.

FIG. 3A illustrates an example of a firmware queue 300-a that supports managing queues using a read counter for quality of service design in accordance with some embodiments of the present disclosure. The firmware queue 300-a illustrates a plurality of memory die queues 305 (e.g., LUN queues 305) that each include one or more priority queues. For example, a first memory die queue 305 can include priority queues 310, 310-a, and 310-b. In some examples, priority queue 310 can correspond to a high priority queue, priority queue 310-a can correspond to a low priority queue, and priority queue 310-b can correspond to a lowest priority queue. The priority queues 310 can include particular commands (e.g., requests to complete commands), and the commands can be issued by a local memory controller (e.g., a flash memory controller) according to the priority level of the respective priority queue 310. In some examples, commands can be assigned to a priority queue 310 on-the-fly, which may result in the issuance of other commands (associated with different priority levels) being temporarily suspended. Incorporating queues at a memory die level can reduce backpressure that a local memory controller may otherwise incur, and may allow for the sub-system to issue commands based on available resources.

As discussed herein, the memory die queue 305 can include priority queues 310, 310-a, and 310-b, which may correspond to a high priority queue, a low priority queue, and a lowest priority queue, respectively. In some examples, the first priority queue 310 can be assigned a highest priority level (e.g., relative to the low priority and lowest priority queues). By assigning the priority queue 310 a highest priority level, any command pertaining to the associated memory die that is placed in the priority queue 310 can be issued (e.g., sent to a local memory controller) before commands in the priority queues 310-a and 310-b. Similarly, the low priority queue 310-a can be assigned an intermediate priority level (e.g., relative to the high priority and lowest priority queues). By assigning the priority queue 310-a an intermediate priority level, any command pertaining to the associated memory die that is placed in the priority queue 310-a can be issued before commands in the priority queue 310-b. In other examples, the third priority queue 310-b can be assigned a lowest priority level (e.g., relative to the high priority and low priority queues). By assigning the priority queue 310-b a lowest priority level, any command pertaining to the associated memory die that is placed in the priority queue 310-b can be issued only when priority queues 310 and 310-a are empty (e.g., they do not contain any commands).

By way of example, the first memory die queue 305 can include command 328 in the priority queue 310 and commands 330 and 330-a in the priority queue 310-a. The first memory die queue 305 can also include commands 335, 335-a, and 335-b in the priority queue 310-b. In some examples, each of the commands in the priority queues 310, 310-a, and 310-b can be different commands that are received at different times. That is, commands can be entered into the priority queues 310, 310-a, and 310-b as they are issued. Accordingly, because the priority queue 310 can be associated with a higher priority level than the priority queues 310-a and 310-b, the command 328 can be issued before the commands 330, 330-a, 335, 335-a, and 335-b.

Additionally or alternatively, one or more of the commands 335, 335-a, and 335-b can be entered into the priority queue 310-b before the commands 328, 330, and/or 330-a are entered into the priority queues 310 and 310-a, respectively. The commands in the priority queue 310-b can be issued (e.g., individually: one-by-one) until a command is entered into either of the priority queue 310 or the priority queue 310-a. When a command is entered into either of the priority queues 310 or 310-a, commands in the priority queue 310-b may not be issued. That is, any commands in the priority queue 310-b can be paused (e.g., placed on hold: suspended) until all commands in the priority queues 310 and/or 310-a are issued. Upon issuing all commands in the priority queues 310 and/or 310-a, any commands in the priority queue 310-b can be issued (or continue being issued). Similarly, commands in the priority queue 310 can be prioritized over commands in the priority queue 310-a. Accordingly, any commands in the priority queue 310-a can be paused (e.g., placed on hold: suspended) until all commands in the priority queue 310 are issued. When commands are satisfied (e.g., the requests from the queues are passed to a local memory controller), the associated command can be entered into a global pool shown in FIG. 3B. Commands in the global pool can be issued by a local memory controller.

In some examples, the second memory die queue 305-a can include commands 340, 340-a, and 340-b in the priority queue 315-a. The second memory die queue 305-a can also include commands 345, 345-a, and 345-b in the priority queue 315-b. As shown in FIG. 3A the priority queue 315 can be temporarily empty (e.g., NULL), but can receive one or more commands (e.g., at a subsequent time; at a different time than shown). In some examples, each of the commands in the priority queues 315-a and 315-b can be different commands that are received at different times. That is, commands can be entered into the priority queues 315-a and 315-b as they are issued. In some examples, the commands can be entered at a same or different time than the commands entered into the priority queues 310-a and 310-b of the first memory die queue 305. Because the priority queue 315-a can be associated with a higher priority level than the priority queue 315-b, the commands 340, 340-a, and 340-b can be issued before the commands 345, 345-a, and 345-b.

As discussed above with respect to the memory die queue 305, one or more of the commands 345, 345-a, and 345-b can be entered into the priority queue 315-b before the commands 340, 340-a and/or 340-b are entered into the priority queue 315-a. The commands in the priority queue 315-b can be issued (e.g., individually: one-by-one) until a command is entered into the priority queue 315-a. When a command is entered into the priority queue 315-a, commands in the priority queue 315-b may not be issued. That is, any commands in the priority queue 315-b can be paused (e.g., placed on hold: suspended) until all commands in the priority queue 315-a are issued. Upon issuing all commands in the priority queue 315-a, any commands in the priority queue 315-b can be issued (or continue being issued). As discussed herein, when commands (e.g., the requests for the commands) are issued from a queue, they can be entered into a global pool shown in FIG. 3B. Commands in the global pool can be issued by a local memory controller.

In some examples, commands may be entered into corresponding priority queues of different memory die queues. For example, the memory die queue 305 and the memory die queue 305-a can both include highest, lower, and lowest priority queues. Accordingly, commands can be issued from corresponding priority queues of different memory die queues either on a die-by-die basis or globally (e.g., based on corresponding priority queues of different memory die queues). For example, the priority queue 310-a can include commands 330 and 330-a, and the priority queue 315-a can include commands 340, 340-a, and 340-b. Because, at any one time, both priority queues can include one or more of the commands, the commands can either be issued on a die-by-die basis—e.g., memory die queue 305 can issue commands according to its own priority queues and memory die queue 305-a can issue commands according to its own priority queues). Or the respective commands can be issued based on an order that the commands were entered into the respective priority queues—e.g., commands 330, 330-a, 340, 340-a, and 340-b can be issued based on the order that each command was entered into the respective priority queue because each command is associated with a same priority level.

In some examples, the firmware queue 300-a can also include a third memory die queue 305-b and a fourth memory die queue 305-c. The fourth memory die queue 305-c can also be or represent an $n^{th}$ memory die queue of the firmware queue 300-a. That is, the firmware queue 300-a can include a plurality of memory die queues that correspond to the memory dies of the memory sub-system. In some examples, the third memory die queue 305-b and fourth memory die queue 305-c can each include one or more priority queues for commands. For example, the third memory die queue 305-b can include commands 350, 350-a, and 350-b in the priority queue 320-a and commands 355, 355-a, and 355-b in the priority queue 320-b. As shown in FIG. 3A the priority queues of the fourth memory die queue 305-c can be temporarily empty (e.g., NULL), but can receive one or more commands (e.g., at later time: at a different time).

As discussed with reference to memory die queues 305 and 305-a, the memory die queues 305-b and 305-c can issue commands according to the priority levels associated with the respective priority queues. For example, commands 350, 350-a, and 350-b can be issued before commands 355, 355-a, and 355-b due to the priority level associated with the priority queue 320-a. In other examples, and as discussed herein, issuance of the commands 355, 355-a, and 355-b may be temporarily suspended (e.g., paused: put on hold) when commands are assigned to the priority queue 320-a. Upon the issuance of any commands in the priority queue 320-a, the issuance of commands in the priority queue 320-b (e.g., commands 355, 355-a, and/or 355-b) may resume. Additionally or alternatively, commands associated with the third memory die queue 305-b and/or the fourth memory die queue 305-c can be issued on a die-by-die basis or globally (e.g., based on corresponding priority queues of different memory die queues).

In some examples, particular commands can be associated with predefined priority levels. For example, a high priority level (e.g., a highest priority level) can be associated with a host read command. That is, each time a host read associated with a particular memory die is issued, it can be assigned to the high priority queue of the memory die queue associated with the particular die. In other examples, a high priority level (e.g., an intermediate priority level) can be associated with a host write command, a read command, a write command, an erase command, or a combination thereof. All other types of commands can be associated with a lowest priority (or lower) priority level.

Accordingly, the processing device may assign high priority commands to a high priority queue (e.g., priority queue 310 by way of example only) of memory die 305, with the high priority queue having or otherwise being associated with a high priority level. The processing device may assign low priority command(s) to a low priority queue (e.g., priority queues 310-a and/or 310-b), with the low priority queue having or otherwise being associated with a low priority level that is different from (e.g., lower than) the high priority level.

In some examples, a counter (or timer) may be associated with the high priority queue (or with each priority queue in some examples). Broadly, the counter (or timer) may track, monitor, or otherwise manage aspects of the number of instances that a command issues from the respective queue. In some examples, a counter may be associated with the high priority queue that tracks, monitor, or otherwise manages the number of high priority commands issuing from the high priority queue without a low priority command issuing from the low priority queue.

In some examples, the counter may be implemented in the situation where there is a mixed read/write workload. In this example, this may include maintaining a firmware counter on a per-die-basis, such that each memory die queue 305 maintains its own counter. In this example, the counter(s) for each memory die 305 may keep count or otherwise track the number of commands issuing from the respective priority queues. For example, a high priority counter may be maintained on the high priority memory die queue 305 that tracks the commands issuing from priority queues 310, a low priority counter may be maintained on the second memory die queue 305-a that tracks the commands issuing from priority queues 315, a lowest priority counter may be maintained on the third memory die queue 305-b that tracks the commands issuing from priority queues 320, and a fourth counter may be maintained on the fourth memory die queue 305-c that tracks the commands issuing from priority queues 325. This may support, for each counter initiated on each memory die 305, the firmware counter tracking how many read operations (e.g., host read commands issuing) have surpassed a write operation, for example.

Based on the counter and different priority levels, a determination may be made that a threshold number of commands from the high priority queue have issued without a command from the low priority queue having issued. For, if the counter exceeds a threshold, this may enable to the memory die queue 305 let the write operation go (e.g., issue a command from the low priority queue). As one example, this may include determining that the threshold number of commands have issued from priority queue 310 before a command from priority queues 310-a and/or 310-c have issued. In another examples, this may include determining that the threshold number of commands have issued from priority queue 320-a before a command from priority queue 320-b has issued.

In some examples, the threshold number provided by the counter may refer to an absolute number of commands having issued (e.g., read operations performed). In some examples, the threshold number provided by the counter may refer to a measure of time in which the commands have issued from the high priority queue without a command issuing from the low priority queue. In some examples, the threshold number provided by the counter may refer to both an absolute number of commands and/or expiry of a threshold amount of time having passed.

In some examples, the threshold number may be selected or otherwise set based on previous, current, and/or expected system performance. In some examples, the threshold number may be selected or otherwise set based on system balancing considerations, system load, system performance, etc. Accordingly, the counter associated with each memory die queue 305 may provide a relief mechanism by which commands from the low priority queue (e.g., any memory die queue 305 that is lower in priority level) are allowed to be processed in lieu of commands from the higher priority queue to prevent the commands assigned to the low priority queue from becoming stale, obsolete, etc. Moreover, this may ensure that the commands assigned to the low priority queue are allowed to be processed, at least to some extent, rather than the low priority queue becoming overly full.

Once the commands from the low priority queue are issued before the next command from the high priority queue issues, the counter may be reset, started over, cleared, etc. For example, the counter may then be reset or cleared after the command(s) from the low priority queue have been allowed to issue. The counter may then be restarted with the issuance of the next command from the high priority queue.

Figure 3B:
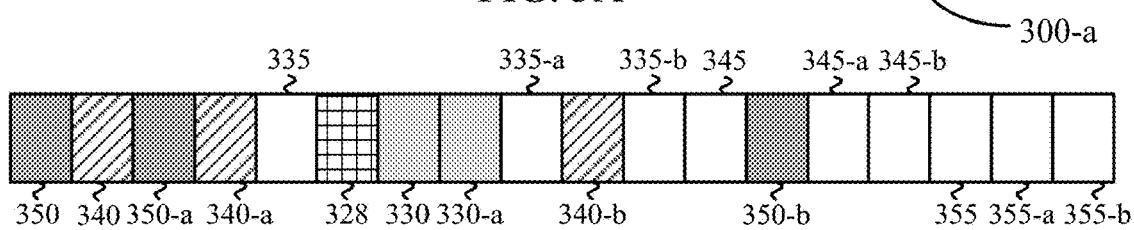
FIG. 3B is an example of a pool of commands for a memory controller in accordance with some embodiments of the present disclosure.

FIG. 3B illustrates an example of a global pool of commands 300-b in accordance with some embodiments of the present disclosure. The global pool of commands 300-b may include one or more commands from the priority queues discussed with reference to FIG. 3A. That is, requests to complete commands may be issued (e.g., released) from the priority queues to the global pool, and a local memory controller may issue an associated command based on the order in which they are entered into the pool. Issuing the commands from the pool in an order received (i.e., according to the time the commands were received and the respective priority of each command) can reduce backpressure that the local memory controller may otherwise incur, and may allow for the sub-system to issue commands based on available resources.

In some examples, the global pool of commands 300-b can include each of the commands discussed with reference to FIG. 3A. The commands can be entered into (e.g., included in) the pool of commands 300-b based on an order received (e.g., by the respective memory die queue 305), a respective priority level associated with the command, or both. In some examples, the commands in the pool of commands 300-b can correspond to one or more resources (e.g., a memory address) associated with the command. That is, the commands in the pool of commands 300-b can be issued by a local memory controller to access a particular memory cell or group of memory cells.

The global pool of commands 300-b can include commands from each of the memory die queues 305 discussed with reference to FIG. 3A. For example, commands 328, 330, 303-a, 335, 335-a, and 335-b from the first memory die queue 305 can be included in the global pool of commands 300-b. Additionally or alternatively, commands 340, 340-a, 340-b, 345, 345-a, and 345-b from the second memory die queue 305-a can be included, as well as commands 350, 350-a, 350-b, 355, 355-a, and 355-b from the second memory die queue 305-b. The commands can be entered into the pool of commands 300-b based on an order received at the respective memory die queue 305, based on a respective priority level associated with the command, or both.

In some examples, command 350 from the second priority queue 320-a of the third memory die queue 305-b can be the high priority command in the pool of commands 300-b. The command 350 can be the high priority command entered into the pool of commands 300-b due to it being received before any commands associated with a higher priority (e.g., command 328). In some examples, the command 350 can be entered into the pool of commands 300-b before other commands associated with a same priority level (e.g., commands 330, 330-a, 340, 340-a, 340-b, 350-a, and/or 350-b) due to the command 350 being received first. Stated another way, the second priority queue 320-a can receive and the command 350 before any other memory die queues receive and issue a command with a same (or higher) priority level.

In some examples, command 340 from the second priority queue 315-a of the second memory die queue 305-a can be the next (e.g., the second) command in the pool of commands 300-b. The command 340 can be entered into the pool of commands based on it being received after the command 350 but before any commands associated with a higher priority (e.g., command 328). In some examples, the command 340 can be entered into the pool of commands 300-b before other commands associated with a same priority level (e.g., commands 330, 330-a, 340, 340-a, 340-b, 350-a, and/or 350-b) due to the command 340 being received first.

In some examples, command 350-a from the second priority queue 320-a of the third memory die queue 305-b can be the next command in the pool of commands 300-b. The command 350-a can be entered into the pool of commands based on it being received after the command 340 but before any commands associated with a higher priority (e.g., command 328). In some examples, the command 350-a can be entered into the pool of commands 300-b before other commands associated with a same priority level (e.g., commands 330, 330-a, 340-a, 340-b, 350-a, and/or 350-b) due to the command 350-a being received first.

In some examples, command 340-a from the second priority queue 315-a of the second memory die queue 305-a can be the next command in the pool of commands 300-b.

The command 340-a can be entered into the pool of commands based on it being received after the command 350-a but before any commands associated with a higher priority (e.g., command 328). In some examples, the command 340-a can be entered into the pool of commands 300-b before other commands associated with a same priority level (e.g., commands 330, 330-a, 340-a, 340-b, and/or 350-b) due to the command 350-a being received first.

In some examples, command 335 from the third priority queue 310-b of the first memory die queue 305 can be the next command in the pool of commands 300-b. The command 335 can be entered into the pool of commands based on it being received when no other memory die queues include higher-priority commands. In some examples, the command 335 can be entered into the pool of commands 300-b before other commands associated with a same priority level (e.g., commands 335-a, 335-b, 345, 345-a, 345-b, 355, 355-a, and/or 355-b) due to the command 335 being received first.

In some examples, command 328 from the first priority queue 310 of the first memory die queue 305 can be the next command in the pool of commands 300-b. The command 328 can be entered into the pool of commands based on its priority alone. For example, because the command 328 is associated with a high priority (e.g., a highest priority), it can be entered into the pool of commands 300-b even if other memory die queues include commands in respective priority queues. For example, the first memory die queue 305 can include commands 330 and 330-a in the second priority queue 310-a. However, due to the priority of the command 328, the command 328 may be issued first (e.g., before commands 330 and 330-a).

In some examples, commands 330 and 330-a from the second priority queue 310-a of the first memory die queue 305 can be the next commands in the pool of commands 300-b. The commands 330 and 330-a can be entered into the pool of commands based on them being received after the command 328 but before any commands associated with a higher priority (e.g., another command in a high priority queue). In some examples, the commands 330 and 330-a can be entered into the pool of commands 300-b before other commands associated with a same priority level (e.g., commands 340-a, 340-b, and/or 350-b) due to the commands 330 and 330-a being received first.

In some examples, command 335-a from the third priority queue 310-b of the first memory die queue 305 can be the next command in the pool of commands 300-b. The command 335 can be entered into the pool of commands based on it being received when no other memory die queues include higher-priority commands. In some examples, the command 335-a can be entered into the pool of commands 300-b before other commands associated with a same priority level (e.g., commands 335-b, 345, 345-a, 345-b, 355, 355-a, and/or 355-b) due to the command 335-a being received first.

In some examples, command 340-b from the second priority queue 315-a of the second memory die queue 305-a can be the next command in the pool of commands 300-b. The command 340-b can be entered into the pool of commands based on it being received after the command 335-a but before any commands associated with a higher priority (e.g., another command in a high priority queue). In some examples, the command 340-b can be entered into the pool of commands 300-b before other commands associated with a same priority level (e.g., command 350-b) due to the command 340-b being received first.

In some examples, commands 335-b and 345 from the third priority queues 310-b and 315-b can be the next commands in the pool of commands 300-b. The commands 335-b and 345 can be entered into the pool of commands based on them being received when no other memory die queues include higher-priority commands. In some examples, the commands 335-b and 345 can be entered into the pool of commands 300-b before other commands associated with a same priority level (e.g., commands 345-a, 345-b, 355, 355-a, and/or 355-b) due to the commands 335-b and 345 being received first. In some examples, command 335-b can be received before command 345, hence it being entered into the pool of commands 300-b first. In other examples, the command 335-b can be received before command 345 based on the first memory die queue 305 being associated with a higher priority level than the second memory die queue 305-a, or based on a random entry of commands associated with a same priority queue.

In some examples, command 350-b from the second priority queue 320-a of the third memory die queue 305-b can be the next command in the pool of commands 300-b. The command 350-b can be entered into the pool of commands based on it being received after the command 345 but before any commands associated with a higher priority (e.g., another command in a high priority queue). In some examples, the command 350-b can be entered into the pool of commands 300-b before any other commands associated with a same priority level due to the command 350-b being received first.

In some examples, each of the remaining commands (e.g., commands 345-a, 345-b, 355, 355-a, and 355-b) can be entered into the pool of commands 300-b last. In some examples, the commands can be entered based on an order received or based on a priority level associated with a respective memory die queue of each command. As discussed herein, each command in the pool of commands 300-b can be issued by a local memory controller according to the order in which it is entered into the pool. In some examples, the order that each command enters the pool of commands 300-b may be based on the counter discussed above with respect to FIG. 3A, e.g., based on when the command issues dependent upon the counter associated with the high priority queue. Issuing commands in such an order (e.g., according to a respective priority level, based on the counter, etc.) can reduce backpressure that the local memory controller may otherwise incur, and may allow for the sub-system to issue commands based on available resources.

Figure 4:
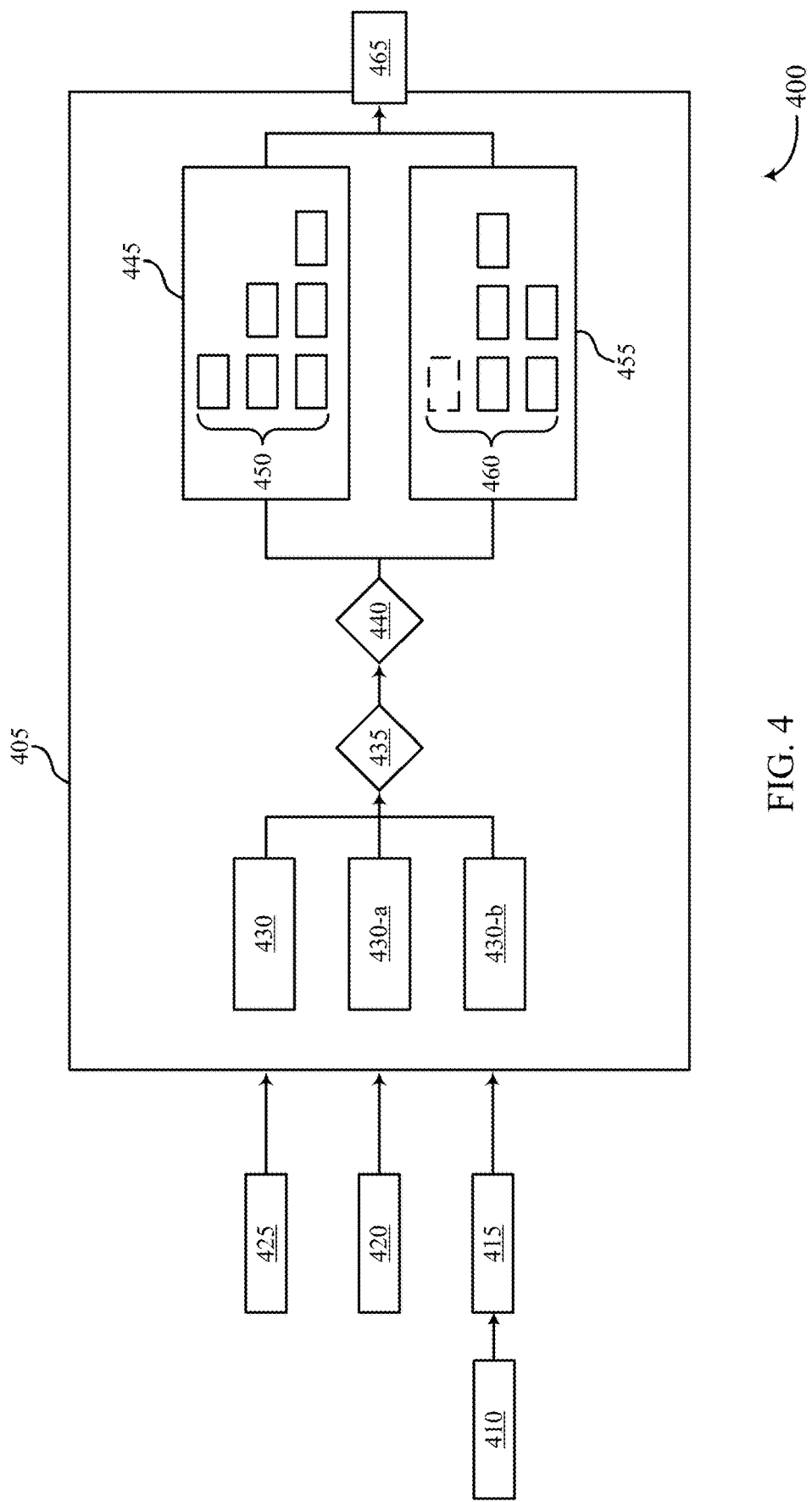
FIG. 4 is an example of a memory system for managing queues using a read counter for quality of service design in accordance with some embodiments of the present disclosure.

FIG. 4 illustrates an example of a memory system 400 for managing queues in accordance with some embodiments of the present disclosure. The memory system 400 can include a memory sub-system 405 that is coupled with a host device 410. In some examples, the host device 410 can communicate with the memory sub-system 405 through a processor 415. The host device 410 can also communicate with a read manager 420 (e.g., a read IO manager) and/or a write manager 425 (e.g., a write IO manager), which can both communicate with the memory sub-system 405. That is, the host device 410 can be coupled with the memory sub-system 405 via the processor 415, read manager 420, and/or the write manager 425. In some examples, the memory sub-system 405 can include one or more reception components (e.g., reception components 430, 430-a, 430-b), a memory die manager 435 (e.g., a LUN manager), a priority manager 440, and memory die queues 445 and 455 that correspond to one or more memory dies. In some examples, the memory sub-system can include more than two memory dies (and subsequently more than two memory die queues). Each memory die queue can include priority queues (e.g., priority queues 450 and 460) which can be examples of the priority queues discussed with reference to FIGS. 3A and 3B. In some examples, the priority queues 450) and 460 can issue commands (e.g., requests to complete associated commands) according to an associated priority. The requests can be entered into a pool of commands 465, where a local memory controller can then issue an associated command. The pool of commands 465 can be an example of the pool of commands 300-*b* as discussed with reference to FIG. 3B.

The host device 410 can communicate with the memory sub-system 405 via the processor 415. In some examples, the host device 410 can transmit one or more commands (e.g., a host read, a host write) to the memory sub-system 405. The commands can be associated with particular memory cells (e.g., blocks of memory cells, memory dies, etc.) of the memory sub-system 405 and can be prioritized accordingly as discussed herein. In some examples, the read manager 420 can manage read operations (e.g., internal read operations) of the memory sub-system 405 and the write manager 425 can manage write operations (e.g., internal write operations) of the memory sub-system 405. The read manager 420 and the write manager 425 can each communicate with the host device 410 and/or the processor 415.

A command may be received by a reception component (e.g., reception component 430, 430-*a*, and/or 430-*b*) of the memory sub-system 405. As discussed above, commands can be received from the host device 410, the read manager 420, and/or the write manager 425. The reception component(s) can pass (e.g., transmit) the received command(s) to the memory die manager 435. In some examples, the memory die manager 435 can determine a particular memory die associated with the command. That is, the memory die manager 435 can determine a memory address associated with a received command. The memory die manager 435 can pass (e.g., transmit) the memory address associated with the received command to the priority manager 440.

The priority manager 440 can determine a priority level associated with a command. As discussed herein, certain commands (e.g., a host read command) can be associated with a high priority level and other commands (e.g., host write commands, read commands, write commands, erase commands, etc.) can be associated with a different priority level that is lower in priority than the high priority level. The priority level of the command can determine the priority queue (of a memory die queue) that a command can be entered in. Thus the memory die manager 435 and the priority manager 440 can determine a memory die (e.g., an address of a memory die) associated with a command and ensure that the command is entered into a correct priority queue associated with the particular die. For example, the command can be entered into one of priority queues 450 or 460.

The memory die queues 445 and 455 can each include one or more priority queues, with each of the one or more priority queues being associated with a counter (or timer). For example, priority queue 450 of memory die queue 445 can represent multiple priority queues as discussed with reference to FIG. 3A. Similarly, priority queue 460 of memory die queue 455 can represent multiple priority queues as discussed with reference to FIG. 3A. As shown in FIG. 4, priority queue 450 can include three priority queues (e.g., a highest, lower, and lowest priority queue) that include one, two, and three commands respectively. Additionally or alternatively, priority queue 460 can include three priority queues (e.g., a highest, lower, and lowest priority queue) that include zero, three, and two commands respectively. The commands can be issued (e.g., released) according to the respective priority level of each command and/or the order in which the commands are entered into the respective priority queues. The commands can be issued based on the counter associated with a respective priority queue. For example, once the threshold number of commands from the high priority queue have issued without a command from a low priority queue having issued, the command(s) from the low priority queue may be issued. Once the requests (e.g., the commands) are released, they can be entered into the pool of commands 465, where they can be issued by a local memory controller. Issuing the commands from the pool of commands 465 in an order received (i.e., according to the time the commands were received and the respective priority of each command) can reduce backpressure that the local memory controller may otherwise incur, and may allow for the sub-system to issue commands based on available resources.

Figure 5:
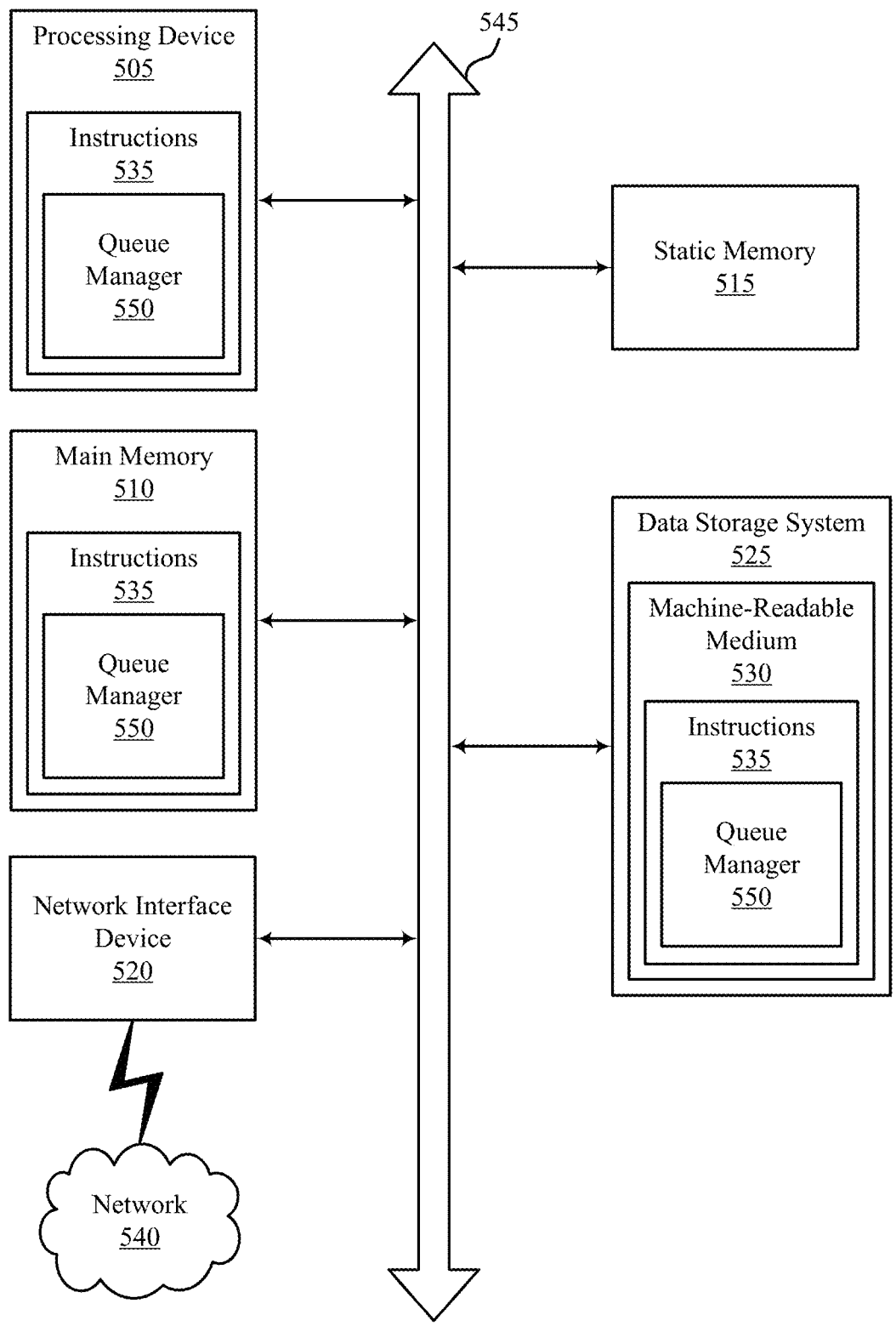
FIG. 5 is an example machine of a computer system in which embodiments of the present disclosure can operate.

FIG. 5 illustrates an example machine of a computer system 500 in which examples of the present disclosure can operate. The computer system 500 can include a set of instructions, for causing the machine to perform any one or more of the techniques described herein. In some examples, the computer system 500 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the queue manager 150) described with reference to FIG. 1). In some examples, the machine can be connected (e.g., networked) with other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 500 can include a processing device 505, a main memory 510 (e.g., ROM, flash memory, DRAM such as SDRAM or Rambus DRAM (RDRAM), etc.), a static memory 515 (e.g., flash memory, static RAM (SRAM), etc.), and a data storage system 525, which communicate with each other via a bus 545.

Processing device 505 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 505 can also be one or more special-purpose processing devices such as an ASIC, an FPGA, a DSP, network processor, or the like. The processing device 505 is configured to execute instructions 535 for performing the operations and steps discussed herein. The computer system 500 can further include a network interface device 520 to communicate over the network 540.

The data storage system 525 can include a machine-readable storage medium 530 (also known as a computer-readable medium) on which is stored one or more sets of instructions 535 or software embodying any one or more of the methodologies or functions described herein. The instructions 535 can also reside, completely or at least partially, within the main memory 510 and/or within the processing device 505 during execution thereof by the computer system 500, the main memory 510 and the processing device 505 also constituting machine-readable storage media. The machine-readable storage medium 530, data storage system 525, and/or main memory 510 can correspond to a memory sub-system.

In one example, the instructions 535 include instructions to implement functionality corresponding to a queue manager 550 (e.g., the queue manager 150 described with reference to FIG. 1). While the machine-readable storage medium 530 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader spirit and scope of examples of the disclosure as set forth in the following claims. The specification and drawings are, accordingly, to be regarded in an illustrative sense rather than a restrictive sense.

What is claimed is:

1. A method by a memory system, comprising:
assigning a first set of commands to a first queue of a memory die of a memory sub-system, wherein the first queue is associated with a first priority level, wherein the memory die includes a second queue associated with a second priority level and a third queue associated with a third priority level, wherein the third priority level is greater than the second priority level, and the first priority level is greater than the third priority level, the second queue comprising a second set of commands assigned to the second queue;
instantiating a timer to determine an amount of time that a second command of the second set of commands from the second queue has not issued;
incrementing a counter each time that a command of the first set of commands issues without the second command of the second set of commands issuing from the second queue;
determining that a threshold number of the first set of commands of the first queue have issued without the second command of the second set of commands issuing from the second queue and that a threshold amount of time is satisfied by the timer, wherein the threshold number is selected based at least in part on both previous system performance and current system performance;
determining that the third queue is empty;

issuing, based at least in part on determining that the threshold number of the first set of commands of the first queue have issued without the second command of the second set of commands issuing from the second queue or determining that the third queue is empty, one or more commands of the second set of commands, wherein the one or more commands of the second set of commands comprises the second command; and issuing, after issuing the one or more commands of the second set of commands, a third command of the first set of commands.

2. The method of claim 1, wherein issuing the one or more commands of the second set of commands comprises:

issuing the second command before issuing the third command of the first set of commands.

3. The method of claim 1, wherein issuing the third command of the first set of commands comprises:

resuming issuing the first set of commands after issuing the one or more commands of the second set of commands.

4. The method of claim 1, further comprising:

resetting, based at least in part on issuing the one or more commands of the second set of commands, the counter.

5. The method of claim 1, further comprising:

assigning a respective set of commands to each of a plurality of first queues, wherein each of the plurality of first queues is associated with a respective memory die of a plurality of additional memory dies of the memory sub-system, and wherein each of the plurality of first queues is associated with the first priority level and wherein each of the plurality of additional memory dies includes a respective second queue associated with the second priority level;

determining, based at least in part on corresponding counters associated with each of the plurality of first queues, that a third threshold number of commands from at least one first queue of the plurality of first queues have issued without a command of a respective set of commands issuing from respective second queues of the plurality of additional memory dies, wherein the third threshold number corresponds to the threshold number; and issuing the respective set of commands from the respective second queues of the plurality of additional memory dies based at least in part on the corresponding counter.

6. The method of claim 1, wherein the first set of commands comprise host read commands, and wherein the second set of commands comprise at least one of a host write command, a read command, a write command, or an erase command.

7. The method of claim 1, wherein issuing the one or more commands of the second set of commands in response to determining the third queue is empty is based at least in part on the third priority level being greater than the second priority level.

8. A memory system, comprising:

one or more memory devices; and processing circuitry coupled with the one or more memory devices and configured to cause the memory system to:

assign a first set of commands to a first queue of a memory die of a memory sub-system, wherein the first queue is associated with a first priority level, wherein the memory die includes a second queue associated with a second priority level and a third queue associated with a third priority level, wherein the third priority level is greater than the second priority level, and the first priority level is greater than the third priority level, the second queue comprising a second set of commands assigned to the second queue;

instantiate a timer to determine an amount of time that a second command of the second set of commands from the second queue has not issued;

increment a counter each time that a command of the first set of commands issues without the second command of the second set of commands issuing from the second queue;

determine that a threshold number of the first set of commands of the first queue have issued without the second command of the second set of commands issuing from the second queue and that a threshold amount of time is satisfied by the timer, wherein the threshold number is selected based at least in part on both previous system performance and current system performance;

determine that the third queue is empty;

issue, based at least in part on determining that the threshold number of the first set of commands of the first queue have issued without the second command of the second set of commands issuing from the second queue or determining that the third queue is empty, one or more commands of the second set of commands, wherein the one or more commands of the second set of commands comprises the second command; and issue, after issuing the one or more commands of the second set of commands, a third command of the first set of commands.

9. The memory system of claim 8, wherein, to issue the one or more commands of the second set of commands, the processing circuitry is configured to cause the memory system to:

issue the second command before issuing the third command of the first set of commands.

10. The memory system of claim 8, wherein, to issue the third command of the first set of commands, the processing circuitry is configured to cause the memory system to:

resume issuing the first set of commands after issuing the one or more commands of the second set of commands.

11. The memory system of claim 8, wherein the processing circuitry is further configured to cause the memory system to:

reset, based at least in part on issuing the one or more commands of the second set of commands, the counter.

12. The memory system of claim 8, wherein the processing circuitry is further configured to cause the memory system to:

assign a respective set of commands to each of a plurality of first queues, wherein each of the plurality of first queues is associated with a respective memory die of a plurality of additional memory dies of the memory sub-system, and wherein each of the plurality of first queues is associated with the first priority level and wherein each of the plurality of additional memory dies includes a respective second queue associated with the second priority level;

determine, based at least in part on corresponding counters associated with each of the plurality of first queues, that a third threshold number of commands from at least one first queue of the plurality of first queues have issued without a command of a respective set of commands issuing from respective second queues of the plurality of additional memory dies, wherein the third threshold number corresponds to the threshold number; and issue the respective set of commands from the respective second queues of the plurality of additional memory dies based at least in part on the corresponding counters.

13. The memory system of claim 8, wherein the first set of commands comprise host read commands, and wherein the second set of commands comprise at least one of a host write command, a read command, a write command, or an erase command.

14. The memory system of claim 8, wherein issuing the one or more commands of the second set of commands in response to determining the third queue is empty is based at least in part on the third priority level being greater than the second priority level.

15. A non-transitory computer-readable storage medium comprising instructions that, when executed by processing circuitry of an electronic device, cause the electronic device to:

assign a first set of commands to a first queue of a memory die of a memory sub-system, wherein the first queue is associated with a first priority level, wherein the memory die includes a second queue associated with a second priority level and a third queue associated with a third priority level, wherein the third priority level is greater than the second priority level, and the first priority level is greater than the third priority level, the second queue comprising a second set of commands assigned to the second queue;

instantiate a timer to determine an amount of time that a second command of the second set of commands from the second queue has not issued;

increment a counter each time that a command of the first set of commands issues without the second command of the second set of commands issuing from the second queue;

determine that a threshold number of the first set of commands of the first queue have issued without the second command of the second set of commands issuing from the second queue and that a threshold amount of time is satisfied by the timer, wherein the threshold number is selected based at least in part on both previous system performance and current system performance;

determine that the third queue is empty;

issue, based at least in part on determining that the threshold number of the first set of commands of the first queue have issued without the second command of the second set of commands issuing from the second queue or determining that the third queue is empty, one or more commands of the second set of commands, wherein the one or more commands of the second set of commands comprises the second command; and issue, after issuing the one or more commands of the second set of commands, a third command of the first set of commands.

16. The non-transitory computer-readable storage medium of claim 15, wherein the instructions to issue the one or more commands of the second set of commands, when executed by the processing circuitry of the electronic device, cause the electronic device to:

issue the second command before issuing the third command of the first set of commands.

17. The non-transitory computer-readable storage medium of claim 15, wherein issuing the one or more commands of the second set of commands in response to determining the third queue is empty is based at least in part on the third priority level being greater than the second priority level.

* * * * *